Patented June 5, 1928.

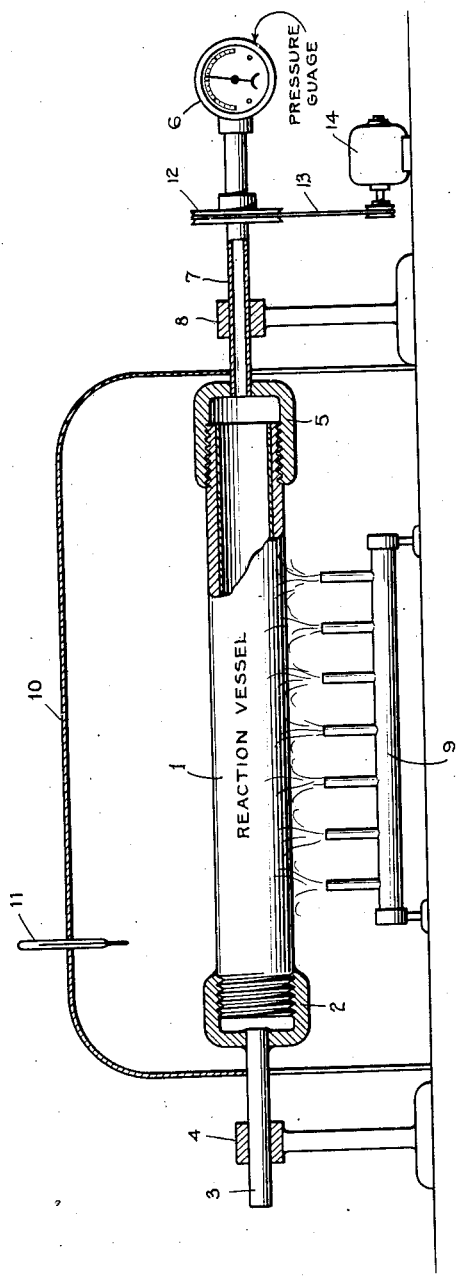

1,672,253

UNITED STATES PATENT OFFICE.

ISAAC V. GILES, OF ELIZABETH, NEW JERSEY, ASSIGNOR TO AMERICAN CYANAMID COMPANY, OF NEW YORK, N. Y., A CORPORATION OF MAINE.

METHOD OF MAKING AROMATIC NITRILES.

Application filed August 25, 1926. Serial No. 131,404.

This invention relates to the production of nitriles, more particularly to the manufacture of aromatic nitriles and derivatives thereof.

A method has been proposed for the production of aromatic nitriles in which a chlor derivative of an aromatic hydrocarbon was caused to react with a heavy metal cyanide at elevated temperatures and pressures. For instance, in the manufacture of benzonitrile, a mixture of chlorbenzol and a cyanide, such as copper cyanide, zinc cyanide, calcium ferrocyanide, potassium ferrocyanide or copper ferrocyanide was made and the mixture either with or without an organic solvent was heated to a relatively high temperature for a predetermined period of time, generally from 8 to 20 hours. In most cases the reaction was incomplete except where copper cyanide was used and in some of the cases the amount of conversion into benzonitrile was almost negligible. Furthermore the cyanides used for the reaction are comparatively expensive and for these reasons the process was not hitherto commercial.

The present invention is intended to obviate the difficulties encountered in the production of organic nitriles from a chlor compound and a cyanide, it being among the objects thereof to devise a method whereby the reaction may be caused to take place cheaply and readily and wherein the reaction goes substantially to completion.

In practicing my invention I utilize simple, soluble cyanides such as of the alkali or alkali earth metals, which class of compounds I term alkali-forming metal cyanides. I mix with the alkali-forming metal cyanide an amount of copper cyanide which is generally less than the alkali-forming metal cyanide, add the mixture to a chlor derivative of a suitable compound, such as chlorbenzol, and heat the same in a closed vessel under pressure for a suitable length of time, generally less than six hours, at a temperature of approximately 250° C. to 350° C., and a pressure of 15 to 30 atmospheres. The reaction goes substantially to completion, the length of time necessary for a complete reaction varying with the type of mixture used and the temperature and pressure in the reaction vessel, but in all cases I find that the reaction requires no more than six hours and in many cases the reaction is complete in one and one-half to two hours.

The single figure of the accompanying drawing is an elevational view of a simple form of apparatus which I have used to carry out my new method.

The reaction vessel 1 is usually of tubular shape and may be constructed of extra heavy iron pipe of suitable diameter, preferably lined with a copper sheath, and it may be in a horizontal or slightly inclined position. One end thereof is permanently closed by a cap 2 which is welded into place and a stub shaft 3 secured thereto rotates in bearing 4. The opposite end of reaction vessel 1 is closed by a cap 5 threaded into place and having a pressure gauge 6 fitting into the same by means of hollow shaft or tube 7 which operates in bearing 8. The reaction vessel is heated by a series of burners 9 placed in proximity thereto and a shield 10 surrounding the reaction vessel and burners retains the heat and so aids in obtaining the desired uniform temperature in the reaction vessel. A thermometer 11 passing through the shield 10 is used for determining the temperature of the space within the shield which closely approximates the temperature within the reaction vessel itself. A pulley 12 fixed on shaft 7 is connected by means of a belt 13 to a motor 14 which is adapted to slowly rotate the reaction vessel to mix the ingredients therein.

In practicing the invention I may make a mixture containing, specifically, equal molecular parts of sodium cyanide and copper cyanide, which is charged into the reaction vessel 1 through the opening obtained by removing cap 5 and a suitable amount of chlorbenzol is placed therein, the cap 5 is threaded into place and the apparatus caused to rotate by actuation of the motor 14 and pulley 12. The burners 9 are lighted and in a short time the reaction vessel reaches the proper temperature for the reaction, which is allowed to take place for a predetermined period of time. I may utilize 50 parts by weight of a mixture containing equal molecular parts of sodium cyanide and copper cyanide and add thereto 175 parts by weight of chlorbenzol, seal the same in the reaction vessel and rotate the vessel at a temperature of 320° C. to 325° C. for about six hours. The pressure within the vessel is maintained at 25 to 28 atmospheres. At the end of this time the vessel is cooled and the benzonitrile formed in the reaction is separated from the other constituents. All of the cyanide in the vessel has disappeared and the yield of benzonitrile is found to be 88 per cent of the theoretical. The remainder represents loss by leakage and in manipulation and the formation of a small amount of tar.

I have found that the above described reaction may be promoted by the addition to the reaction mixture of a portion of the residue obtained from a previous run. This residue contains principally cuprous chloride which is formed as follows:

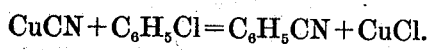

By the addition of a small amount of such a material the reaction may be caused to take place at a lower temperature and pressure or in a shorter time. For instance, I have made a mixture of equal molecular parts of sodium cyanide and copper cyanide with a suitable amount of chlorbenzol and added an amount of cuprous chloride residue equal to from 10 to 20 per cent of the cyanide present and heated the same to a temperature of 260° C. to 280° C. at a pressure of 20 to 23 atmospheres for about 5½ hours. The yield of benzonitrile was in this case about 86 per cent of the theoretical.

I have been enabled to increase the proportion of sodium cyanide in both mixtures to a still greater proportion with excellent results and have successfully used a mixture containing 10 molecular parts of sodium cyanide to one molecular part of copper cyanide with a complete conversion and a high yield of benzonitrile. However, I have found that the higher the proportion of alkali-forming metal cyanide, the higher should be the temperature of the reaction vessel but this temperature should not ordinarily exceed 350° C.

It is not necessary to use a pure alkali-forming metal cyanide in this process as I have obtained equally as good results with an impure cyanide as with a pure cyanide. For example, I have used a porous briquetted sodium cyanide containing about 90 per cent NaCN and derived from the residue obtained in the manufacture of beet sugar and commonly known as "beet cyanide". A mixture containing this material in the molecular proportion of ten parts to one part of copper cyanide gave a complete conversion and a yield of about 85 per cent of the theoretical amount of benzonitrile. This beet cyanide appeared to act more favorably than a purer cyanide which had been produced in the fused state and I am inclined to believe that the physical condition of the cyanide used is an important factor in the results obtained. When a porous material is used, a speedier and more complete reaction probably takes place, whereby I am enabled to use a very high proportion of sodium cyanide in the mixture.

I have also found that a crude cyanide containing about 50 per cent calcium cyanide, together with various impurities, such as alkali or alkali earth metal salts, lime, carbon and others is also well adapted for use in the present method, the great advantage in the utilization thereof being the extreme cheapness of the raw material. For example, I have made a mixture of 3 molecular parts of impure calcium cyanide in the form of flakes with 1 molecular part of copper cyanide and a suitable amount of chlorbenzol which was heated to 330° C. at 24 to 27 atmospheres for six hours. Substantially all of the contained cyanide was converted and the yield of benzonitrile was about 87.5 per cent of the theoretical. Even higher proportions of impure calcium cyanide may be used in the method with equally good results, it being desirable, however, that the calcium cyanide be in the form of flakes or granules rather than in the form of dust. It would appear that a better or more complete reaction is obtained in this case when the particles are of relatively large size.

The benzonitrile formed in this reaction may be redistilled from the other products thereof and purified in any suitable manner and sold as such. However, I prefer to convert the same either into benzoic acid or a benzoate such as sodium benzoate, which may be accomplished in a very simple and satisfactory manner. Benzonitrile may be readily hydrolyzed with sulphuric acid and the resulting benzoic acid may be separated from the solution containing excess sulphuric acid and ammonium sulphate. However, a simpler method consists in conducting the hydrolysis with a caustic soda solution of 20 to 35 per cent or even less at ordinary pressure for a suitable time, generally 2 to 3 hours, with the use of a reflux condenser. When the reaction is complete the residue is solid sodium benzoate to which is added a sufficient amount of water to dissolve the same, the solution being then filtered to remove sediment and evaporated to dryness, giving a very pure product. If a slight excess of caustic soda is used in the hydrolysis it is desirable to add to the solution prior to the evaporation a sufficient amount of benzoic acid to combine with the free caustic soda present, thus obtaining a product free from alkali.

Although I have described my invention, setting forth several specific embodiments thereof and showing that sodium cyanide and calcium cyanide may be successfully used in the production of benzonitrile, my invention is not limited to the specific compounds mentioned. Other alkali and alkali earth metal cyanides may be substituted for those mentioned, and in the claims I intend to include by the term alkali-forming metal cyanides, the cyanides of the various alkali and alkali earth metals. In place of the chlorbenzol I may use chlor derivatives of other aromatic hydrocarbons of homologous nature or containing other substituted groups. It is not essential that copper cyanide be present in the reaction mixture initially, and I have conducted my method by using a mixture of cuprous chloride and sodium cyanide instead of a mixture of cyanides as set forth in the examples given above, and by the term "copper cyanide" as used in the claims I intend to include not only copper cyanide but also mixtures which give rise to or have the same effect as copper cyanide. The proportions of the ingredients, the temperatures, pressures and times of treatment are given only for purposes of illustration and are not considered to be at all limiting as it is apparent that these details may be varied within wide limits with excellent results. These and other changes may be made in my invention, the scope of which is defined in the claims appended hereto.

What I claim is:

1. A method of making aromatic nitriles which comprises providing a halogenated aromatic hydrocarbon, adding thereto a mixture of copper cyanide and an alkali-forming metal cyanide, and heating the same.

2. A method of making aromatic nitriles which comprises providing a halogenated aromatic hydrocarbon, adding thereto a mixture of copper cyanide and an alkali-forming metal cyanide, the latter being the major constituent of the mixture, and heating the same.

3. A method of making aromatic nitriles which comprises providing a halogenated aromatic hydrocarbon, adding thereto a mixture of copper cyanide and an alkali-forming metal cyanide, the latter being the major constituent of the mixture, and heating the same.

4. A method of making aromatic nitriles which comprises providing a halogenated aromatic hydrocarbon, adding thereto a mixture of copper cyanide and an alkali-forming metal cyanide, the relative proportions thereof being one part copper cyanide to at least three parts alkali-forming metal cyanide, and heating the same.

5. A method of making aromatic nitriles which comprises providing a halogenated aromatic hydrocarbon, adding thereto a mixture of copper cyanide and an alkali-forming metal cyanide, the latter being the major constituent of the mixture and being in particles of relatively large size, and heating the same.

6. A method of making aromatic nitriles which comprises providing a halogenated aromatic hydrocarbon, adding thereto a mixture of copper cyanide and an alkali-forming metal cyanide, the latter being the major constituent of the mixture and being in the form of flakes, and heating the same.

7. A method of making aromatic nitriles which comprises providing a halogenated aromatic hydrocarbon, adding thereto a mixture of a copper salt and an alkali-forming metal cyanide, and heating the same.

8. A method of making aromatic nitriles which comprises providing a halogenated aromatic hydrocarbon, adding thereto a mixture of cuprous chloride and an alkali-forming metal cyanide, and heating the same.

9. A method of making aromatic nitriles which comprises providing a halogenated aromatic hydrocarbon, adding thereto a mixture of copper cyanide, cuprous chloride and an alkali-forming metal cyanide, and heating the same.

In testimony whereof, I have hereunto subscribed my name this 12th day of August, 1926.

ISAAC V. GILES.